United States Patent [19]
Chan et al.

[11] Patent Number: 5,977,778
[45] Date of Patent: Nov. 2, 1999

[54] METHOD AND APPARATUS FOR SENSING PISTON POSITION

[75] Inventors: Danley C. Chan, West Burlington, Iowa; Alan D. Berger, Winfield, Ill.

[73] Assignee: Case Corporation, Racine, Wis.

[21] Appl. No.: 08/753,791

[22] Filed: Nov. 27, 1996

[51] Int. Cl.⁶ .............................. G01R 29/02; G01R 26/27
[52] U.S. Cl. .............................. 324/635; 91/361; 92/5 R; 324/642
[58] Field of Search ..................................... 324/636, 637, 324/639, 642, 635; 91/361; 92/5 R; 342/124

[56] References Cited

U.S. PATENT DOCUMENTS

| | | |
|---|---|---|
| 3,160,836 | 12/1964 | Farley . |
| 4,126,047 | 11/1978 | Sethares et al. . |
| 4,520,660 | 6/1985 | Hitchcock . |
| 4,543,649 | 9/1985 | Head et al. . |
| 4,584,472 | 4/1986 | Wiblin et al. . |
| 4,588,953 | 5/1986 | Krage . |
| 4,631,478 | 12/1986 | Knetsch et al. . |
| 4,689,553 | 8/1987 | Haddox . |
| 4,737,705 | 4/1988 | Bitar et al. . |
| 4,742,794 | 5/1988 | Hagstrom . |
| 4,749,936 | 6/1988 | Taplin . |
| 4,757,745 | 7/1988 | Taplin . |
| 4,774,465 | 9/1988 | Nilius . |
| 4,866,269 | 9/1989 | Wlodarczyk et al. . |
| 4,901,628 | 2/1990 | Krage . |
| 4,938,054 | 7/1990 | Dye et al. . |
| 4,961,055 | 10/1990 | Habib et al. . |
| 4,987,823 | 1/1991 | Taplin et al. . |
| 5,000,650 | 3/1991 | Brewer et al. . |

(List continued on next page.)

FOREIGN PATENT DOCUMENTS

| | | |
|---|---|---|
| 26606A2 | 5/1988 | European Pat. Off. . |
| 31 16 333 | 11/1982 | Germany . |
| 94 17204 | 2/1995 | Germany . |
| 2172995 | 10/1986 | United Kingdom . |

OTHER PUBLICATIONS

Brochure: *TECHNIK*, Absolute Position Measurement Using Conductive Plastic Potentiometers.
Brochure: *Penny + Giles*, Technology Leaders in Displacement Monitoring & Manual Control.
Brochure: *DC Hydrastar*, Position Transducer.
*Sensors: An LVDT Primer*, Jun. 1996.
Brochure: *Understanding Magnetostictive LOTs Hydraulics & Pneumatics*, by W.D. Peterson, Feb. 1993.
Brochure: *Penny + Giles Product Data*, Cylinder Transducer Model HLP100.
Magazine: *Business Week, Not Just a Blip on the Screen*, Feb. 19, 1996.

*Primary Examiner*—Maura Regan
*Attorney, Agent, or Firm*—Foley & Lardner

[57] ABSTRACT

A system for determining the position of a piston moveable within a cylinder, or of an implement or joint, is disclosed herein. Electromagnetic (EM) bursts such as ultra-wideband or frequency pulses are generated and applied to a transmitter/receiver unit. The EM bursts are launched by the transmitter along a transmission guide from an end of the cylinder housing towards the piston. The transmission guide can be a dipstick mounted within the cylinder housing or the cylinder housing itself. The dipstick or cylinder housing is in electrical communication with the piston such that a surface of the piston represents an electrical impedance discontinuity which causes the EM bursts to be reflected back to the receiver. The time for the EM bursts to travel from the transmitter to the piston and for the reflections to travel back to the receiver is determined and converted into a position signal representing the piston's position. A compensation signal can be used to compensate the position signal for variations in a parameter of the fluid within the cylinder such as dielectric constant caused by factors such as temperature, contamination and fluid type. The compensation circuit can include a pulse level analyzer, resonance circuit, capacitance circuit, compensation dipstick, or second transmitter/receiver circuit configured to measure the piston's position from the opposite end of the cylinder.

25 Claims, 6 Drawing Sheets

U.S. PATENT DOCUMENTS

| | | |
|---|---|---|
| 5,104,144 | 4/1992 | Bethell . |
| 5,150,049 | 9/1992 | Schuetz . |
| 5,150,060 | 9/1992 | Bitar . |
| 5,182,979 | 2/1993 | Morgan . |
| 5,182,980 | 2/1993 | Greer . |
| 5,233,293 | 8/1993 | Huang et al. . |
| 5,241,278 | 8/1993 | Bitar . |
| 5,247,172 | 9/1993 | Riemer . |
| 5,260,665 | 11/1993 | Goldberg et al. . |
| 5,274,271 | 12/1993 | McEwan . |
| 5,325,063 | 6/1994 | Morgan . |
| 5,332,938 | 7/1994 | McEwan . |
| 5,345,471 | 9/1994 | McEwan . |
| 5,361,070 | 11/1994 | McEwan ................................. 342/21 |
| 5,422,607 | 6/1995 | McEwan . |
| 5,438,261 | 8/1995 | Codina et al. . |
| 5,438,274 | 8/1995 | Bitar et al. . |
| 5,455,769 | 10/1995 | Panoushek et al. . |
| 5,457,394 | 10/1995 | McEwan . |
| 5,465,094 | 11/1995 | McEwan . |
| 5,471,147 | 11/1995 | Allen et al. . |
| 5,471,162 | 11/1995 | McEwan . |
| 5,479,120 | 12/1995 | McEwan . |
| 5,491,422 | 2/1996 | Bitar et al. . |
| 5,510,800 | 4/1996 | McEwan . |
| 5,512,834 | 4/1996 | McEwan . |
| 5,517,198 | 5/1996 | McEwan . |
| 5,519,342 | 5/1996 | McEwan . |
| 5,519,400 | 5/1996 | McEwan . |
| 5,521,600 | 5/1996 | McEwan . |
| 5,523,760 | 6/1996 | McEwan . |
| 5,536,536 | 7/1996 | Kelley . |
| 5,540,137 | 7/1996 | Lark et al. . |
| 5,563,605 | 10/1996 | McEwan . |
| 5,573,012 | 11/1996 | McEwan . |
| 5,576,627 | 11/1996 | McEwan . |
| 5,581,256 | 12/1996 | McEwan . |
| 5,589,838 | 12/1996 | McEwan . |
| 5,609,059 | 3/1997 | McEwan . |
| 5,617,034 | 4/1997 | Lark et al. . |

METHOD AND APPARATUS FOR SENSING PISTON POSITION

FIELD OF THE INVENTION

The invention generally relates to determining the position or orientation of an implement or joint of an agricultural vehicle (e.g., tractor, combine, etc.), or construction vehicle (e.g., backhoe, crane, dozer, trencher, wheeled, tracked, or skid-steer loader, etc.). In particular, the invention relates to transmitting electromagnetic (EM) bursts along the housing of a hydraulic or pneumatic cylinder used to move an implement or joint, detecting reflections of the bursts from a piston moveable within the housing, and determining the position of the piston based upon the time between transmitting the bursts and detecting the reflections.

BACKGROUND OF THE INVENTION

Pneumatic and hydraulic cylinders are extensively used in actuator assemblies for moving implements, arms, booms and other components of mobile hydraulic machines such as tractors, combines, excavators, dozers, loader-backhoes, etc. For example, tractor-mounted implements such as plows are typically supported by hitch assemblies which include hydraulic cylinders for raising and lowering the implements. Harvesting heads on combines, blades on dozers, and buckets on loader-backhoes are further examples of implements typically positioned by hydraulic cylinders.

Electrohydraulic control systems for such actuator assemblies require position feedback signals representing the positions of the implements or mechanical joints being controlled. Some sensing assemblies (e.g., LVDTs) which provide position feedback signals are coupled to implements or mechanical joints using external linkages. External sensing assemblies, however, are subject to external impacts and other environmental influences.

The positions of implements or mechanical joints can also be determined using sensing assemblies internal to the cylinder. The internal sensing assemblies measure the extension of the cylinders which move the implements or mechanical joints. Cylinder extension is determined by measuring the position of the piston within the cylinder housing. The piston, in turn, moves a cylinder rod coupled to the implement or mechanical joint. The position of the implement or the joint is then determined as a function of piston position which depends upon the geometry of the particular mechanical system.

Various forms of apparatus for measuring positions of pistons within hydraulic cylinders are available. For example, the positions of pistons within cylinders have been measured using acoustic signals, radiofrequency (RF) signals and microwave signals with different sensing assemblies and circuit configurations. However, these apparatus suffer from such drawbacks as relatively high complexity and cost, relatively low reliability, durability and accuracy, and the need to extensively modify the cylinders to accommodate the sensing assembly.

SUMMARY OF THE INVENTION

Accordingly, the invention provides an improved position sensing system for determining the position of an implement or mechanical joint. Advantages which can be realized by using such a system include providing a sensing assembly internal to the pneumatic or hydraulic cylinder where it is shielded from external impacts and environmental influences; providing an improved system for determining the position of a piston moveable within a cylinder housing; providing a system which uses EM burst signals to determine piston position; providing a reliable, durable, and accurate system at relatively low complexity and cost; and providing a sensing assembly requiring minimal modifications to the cylinder.

One embodiment of the invention provides a method of determining the positions of a piston moveable within a cylinder housing. The method includes the steps of: (1) generating EM bursts; (2) launching the EM bursts along the cylinder housing towards the piston, whereby the cylinder housing acts as a transmission guide for the EM bursts; (3) detecting reflections of the EM bursts along the cylinder housing from the piston; (4) generating a timing signal representative of the time between launching the EM bursts and detecting the reflections; and (5) converting at least the timing signal into a position signal representative of the position of the piston within the cylinder housing.

Another embodiment of the invention provides an apparatus for determining the positions of a piston moveable within a cylinder housing. The apparatus includes a generator for generating EM bursts and a transmitter coupled to the generator and to the cylinder housing. The transmitter is configured to launch the EM bursts towards the piston along the cylinder housing, whereby the cylinder housing acts as a transmission guide for the EM bursts. The apparatus further includes a receiver coupled to the cylinder housing and configured to detect reflections after the EM bursts are reflected by the piston towards the receiver along the cylinder housing, a timing circuit configured to generate a timing signal representative of the time for the EM bursts to travel from the transmitter to the piston and for the reflections to travel from the piston to the receiver, and a conversion circuit configured to convert at least the timing signal into a position signal representative of the position of the piston within the cylinder housing.

Another embodiment of the invention provides an electrohydraulic control system for controlling the positions of an implement. The system includes an input device configured to generate command signals representative of a commanded position of the implement, and a hydraulic actuator coupled to the implement. The actuator includes a cylinder housing, a piston moveable within the cylinder housing, and a cylinder rod attached to the piston, whereby the cylinder rod moves with the piston. The system also includes a source of pressurized hydraulic fluid, and a valve assembly coupled between the actuator and the source. The valve assembly is configured to control the flow of hydraulic fluid between the actuator and the source in response to control signals. The system further includes a generator for generating EM bursts, and a transmitter coupled to the generator and to the cylinder housing. The transmitter is configured to launch the EM bursts towards the piston along the cylinder housing, whereby the cylinder housing acts as a transmission guide for the EM bursts. The system further includes a receiver coupled to the cylinder housing and configured to detect reflections after the EM bursts are reflected by the piston towards the receiver along the cylinder housing, a timing circuit configured to generate a timing signal representative of the time for the EM bursts to travel from the transmitter to the piston and for the reflections to travel from the piston to the receiver, a conversion circuit configured to convert at least the timing signal into a position signal representative of the position of the piston within the cylinder housing, and a control circuit coupled to the input device, the valve assembly and the conversion circuit. The control circuit is configured to generate the control signals based upon the command signals and the position signal and to apply the control signals to the valve assembly.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
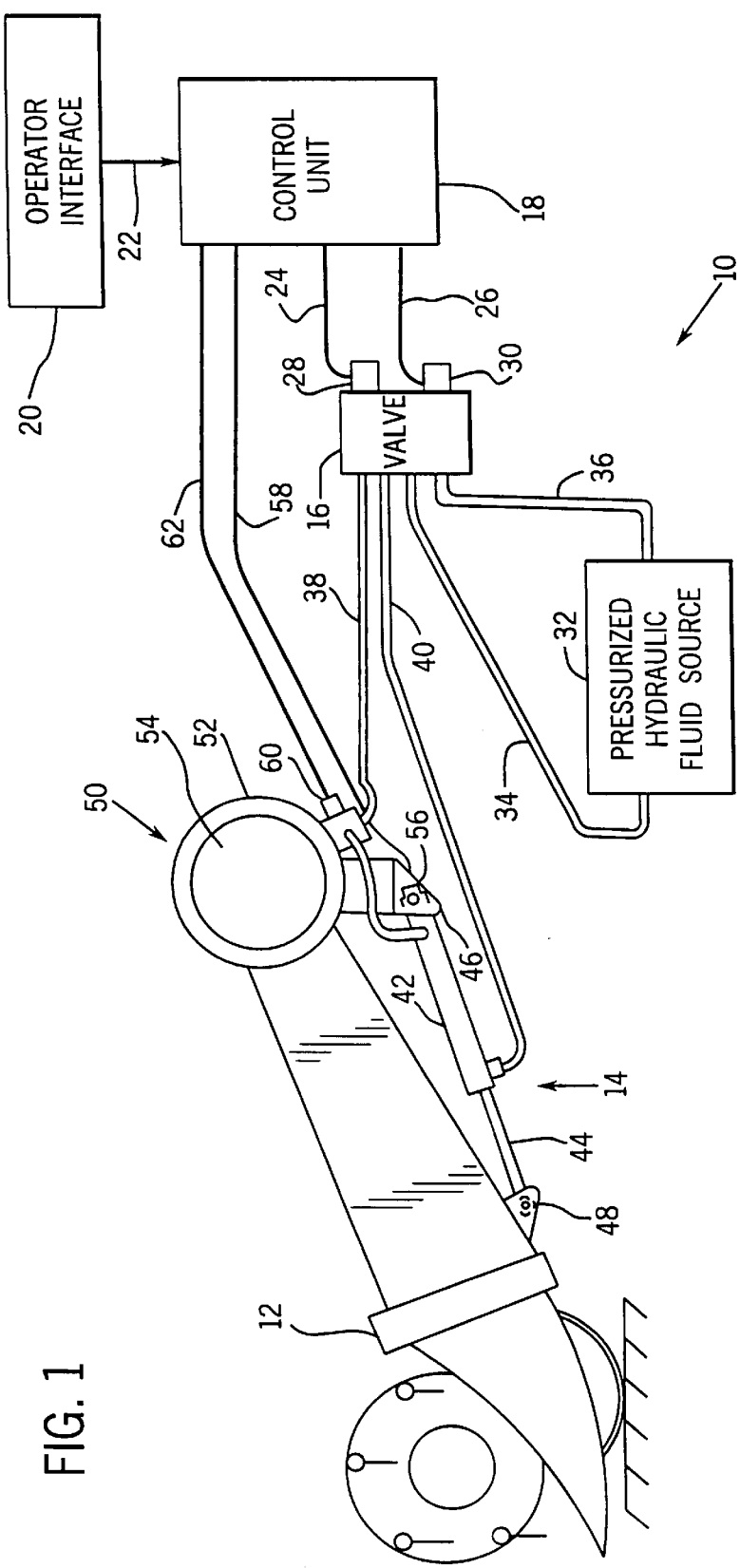
FIG. 1 is a block diagram illustrating an implement position control system for an off-highway vehicle.

Referring to FIG. 1, an electrohydraulic control system 10 used in an off-highway vehicle is shown. This system controls the position or orientation of a joint or implement 12 (e.g., head, plow, bucket, blade, etc.) of an agricultural vehicle (e.g., tractor, combine, etc.), or construction vehicle (e.g., backhoe, crane, dozer, trencher, wheeled, tracked or skid-steer loader, etc.).

Control system 10 controls the position of implement 12 using a hydraulic actuator 14 supplied with pressurized hydraulic fluid from a valve assembly 16. Valve assembly 16 receives raise and lower signals from a control unit 18 in response to commands from an operator interface 20. Control unit 18 can control the position of implement 12 in a closed-loop as described below.

Control unit 18 includes a microprocessor-based circuit or a dedicated, specific-purpose hard-wired circuit. Operator interface 20 includes operator-actuatable command devices such as potentiometers and switches which generate command signals sent to control unit 18 via a signal bus 22. The command signals, for example, represent raise and lower signals, reference position signals, raise and lower rate signals and mode select signals (e.g., manual, replay, return-to-position, float or height control mode). Other applications include different command devices which generate command signals appropriate for the particular application.

In response to the command signals from operator interface 20, control unit 18 generates a raise signal 24 and a lower signal 26 which are applied to a raise solenoid 28 and a lower solenoid 30 mounted on valve assembly 16, respectively. Raise signal 24 and lower signal 26 may be, for example, pulse-width-modulated (PWM) signals. In response to signals 24 and 26, valve assembly 16 controls the flow of pressurized hydraulic fluid between a source 32 and hydraulic actuator 14. Source 32 includes a pump connected in series with a fluid storage tank and filters (not shown). The hydraulic fluid is transferred through conduits (e.g., hoses, tubes, etc.) 34, 36, 38 and 40.

In the present embodiment, actuator 14 includes a hydraulic cylinder having a cylinder housing 42 and a cylinder rod 44 which is moved in the longitudinal direction of the cylinder by a piston 68 (not shown) within cylinder housing 42. By way of a further example, a pneumatic cylinder may be used for other applications. In pneumatic cylinder applications, a gas is used as the pressurized fluid. The force which drives piston 68 is provided by the pressurized hydraulic fluid supplied to actuator 14 by valve assembly 16. The actuator 14 is connected between first and second attachment members 46 and 48 such that changes in the piston's position change the position or orientation of implement 12. Actuator 14 can also be oriented in the reverse direction such that rod 44 connects to attachment member 46 instead of 48.

Implement 12 is supported by a vehicle (not shown) using a bearing assembly 50 including first and second bearing portions 52 and 54. First bearing portion 52 is fixed and second bearing portion 54 is rotatable with respect to the vehicle. Implement 12 is fastened to second bearing portion 54 such that implement 12 is rotatable about the axis of bearing assembly 50. First and second attachment members 46 and 48 are connected to first bearing portion 52 and implement 12, respectively, so changes in extension of the cylinder cause implement 12 to rotate with respect to the vehicle.

Control unit 18 receives a position feedback signal from a position sensing unit 56 via bus 58 and a pressure signal from a pressure sensor 60 via bus 62. Position sensing unit 56 is coupled to cylinder housing 42 as described below. Position sensing unit 56 replaces other position sensors such as LVDTs mounted between implement 12 and bearing portion 52 by external linkages. Pressure sensor 60 measures the pressure of the hydraulic fluid.

In operation, command devices within operator interface 20 send desired command signals to control unit 18. Control unit 18 responds by generating raise and lower signals and applying them to raise and lower solenoids 28 and 30 of valve assembly 16. Valve assembly 16 selectively controls the flow of pressurized hydraulic fluid from source 32 to front and rear ports of cylinder housing 42 which causes piston 68 within the cylinder to move longitudinally. Movement of piston 68 causes cylinder rod 44 to extend or retract, thereby changing the distance between attachment members 46 and 48. An increased distance causes implement 12 to rotate clockwise about bearing assembly 50 and a decreased distance causes implement 12 to rotate in the counterclockwise direction. Extension or retraction of the cylinder is forced by hydraulic fluid, or can be determined by the interaction of implement 12 with the ground (e.g., in float mode). The position of implement 12 and the pressure of the fluid are provided to control unit 18 by position sensing unit 56 and pressure sensor 60. Thus, the position of implement 12 can be controlled in closed-loop fashion based upon an error signal between the command signals from operator interface 20 and position feedback signals from position sensing unit 56.

Control system 10, except for position sensing unit 56 and its interface, is further described in U.S. Pat. No. 5,455,769, commonly assigned and incorporated herein by reference. A control system for a tractor hitch assembly is described in U.S. Pat. No. 5,421,416, and a system to move an arm on a construction vehicle using a cylinder is described in U.S. Pat. No. 5,000,650, both commonly assigned and incorporated herein by reference.

Position sensing system 56 determines the position or orientation of implement 12 by measuring the position of piston 68 within cylinder housing 42. Once the piston position is known, control unit 18 can calculate the position or orientation of implement 12 as a function of piston position and the geometrical parameters of the machine system. Position sensing system 56 includes a micropower impulse radar (MIR) as explained below.

Figure 2:
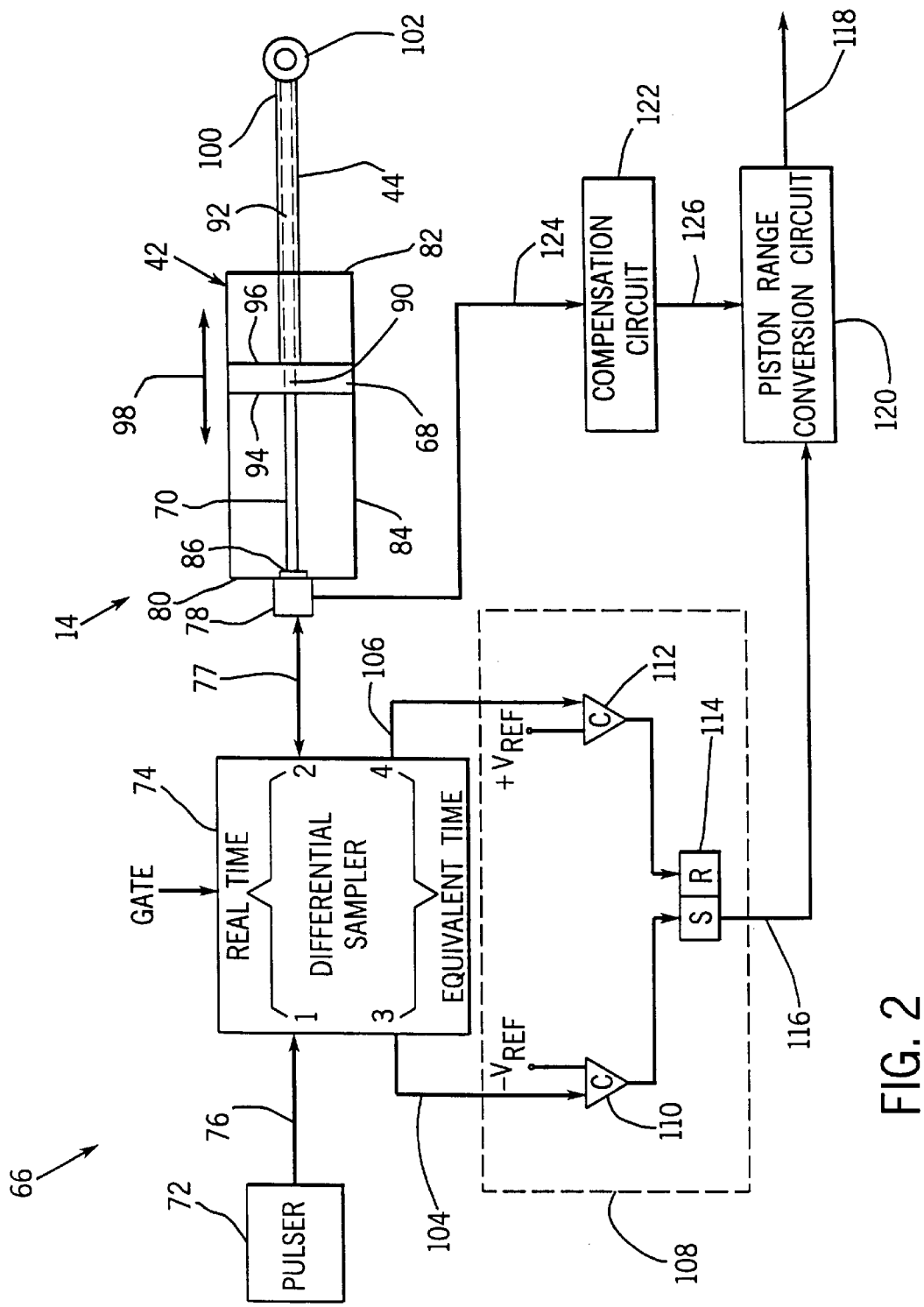
FIG. 2 is a block diagram showing a hydraulic cylinder and a circuit for sensing the position of a piston moveable within the cylinder by transmitting and receiving electromagnetic (EM) bursts such as ultra-wideband (UWB) pulses along a dipstick assembly mounted within the cylinder.

FIG. 2 shows hydraulic actuator 14 and an MIR circuit 66 for sensing the position of piston 68 by transmitting and receiving electromagnetic (EM) pulses or bursts along a dipstick 70. A sequence of EM bursts are generated by a generator 72 and applied to a directional sampler 74 via a transmission line 76.

Preferably, the EM bursts are ultra-wideband (UWB) or square-wave pulses. U.S. Pat. No. 5,457,394, herein incorporated by reference, describes a circuit including a generator of UWB pulses which are 200 psec wide, and are repeated at a pulse-repetition interval (PRI) of 1 MHz. However, other pulse widths and PRIs can be used. The UWB pulses are repeated to allow the integration or averaging of approximately 10,000 reflected pulses for increased noise immunity. Noise immunity can be further increased by modulating (e.g., dithering or randomizing) the pulses. The UWB pulses are unlike acoustic, RF and microwave signals since they are a sequence of impulses having no carrier frequency. No specific frequency is associated with the UWB pulses, and the frequency spectrum is related by the Fourier transform of the pulses. The UWB term refers to the wide spectrum of frequencies comprising the pulses. A timing generator with a crystal oscillator for high accuracy is described in U.S. Pat. No. 5,563,605, incorporated herein by reference. A circuit used to generate a GATE input signal for sampler 74 is also described in this patent.

The EM bursts, however, are not limited to square pulses and the bursts may include pulses having any shape and form. For example, the pulses may include sine-wave signals of a combination of sine-waves having a carrier frequency component in the, RF, microwave, ect. signal range. The frequency pulses are repeated at a predetermined frequency less than the frequency of the carrier. Although the sampling circuit described below can process frequency pulses, the circuitry for generating frequency pulses is more complex and expensive than the circuitry used to generate square pulses. The remainder of this description assumes that the EM bursts are UWB pulses. However, as noted, pulses having a frequency component can also be used.

Directional sampler 74 includes four ports. Ports 1 and 2 are "real-time" bidirectional ports. Port 1 receives the UWB transmit (T) pulses from pulse generator 72 and couples the T pulses to port 2. Port 2 transmits the real-time T pulses through interconnect cable 77 to a transmitter/receiver unit 78, and receives a portion of the T pulses as real-time reflected (R) pulses from unit 78. Ports 3 and 4 are sampled "equivalent-time" ports that output signals from a differential sampler within directional sampler 74. Thus, ports 3 and 4 are not bidirectional. Port 3 is coupled to port 1 in equivalent time and is isolated from the R pulses at port 2. Port 3 generates an equivalent-time replica of the T pulses at port 1. For example, when the seal-time T pulses at port 1 have a 200 psec pulse-width, the equivalent-time replica of the T pulses appearing at port 3 have a pulse width of 200 usec. Port 4 is coupled to port 2 in equivalent time and is isolated from the T pulses at port 1. Port 4 generates an equivalent-time replica of the R pulses at port 2. Thus, equivalent-time replicas of the T and R signals at ports 1 and 2 appear at ports 3 and 4.

The isolation between port 3 and the R pulses and between port 4 and the T pulses allows directional sampler 74 to accurately distinguish the T pulses from the R pulses even when the T and R pulses overlap, such as when piston 68 is close to transmitter/receiver unit 78. Directional sampler 74 is further described in U.S. Pat. No. 5,517,198, incorporated herein by reference.

Transmitter/receiver unit 78 is coupled to the rear end 80 of cylinder housing 42. Cylinder housing 42 also has a front end 82 and a cylindrical side wall 84 between ends 80 and 82. As shown in FIG. 2, transmitter/receiver unit 78 can be coupled to rear end 80 substantially at the longitudinal axis of the cylinder.

Transmitter/receiver unit 78 is in electrical communication with dipstick 70 via a pulse launcher 86 supported by rear end 80 and coupled to the dipstick. Pulse launcher 86 is an antenna or launcher plate (e.g., a circular steel plate), and dipstick 70 includes a conductive guide wire or metal (e.g., steel) rod mounted within cylinder housing 42 between ends 80 and 82. Dipstick 70 makes electrical contact with pulse launcher 86 such that the T pulses applied to the transmitter of unit 78 are launched into dipstick 70 towards piston 68. Thus, dipstick 70 acts as a transmission guide for the transmitted UWB pulses.

Transmitter/receiver unit 78 can be integral (i.e., one-piece) with pulse launcher 86, or can be separate and connected by wires. An integral unit may be more cost-effective, and a separate unit may increase flexibility in mounting unit 78. The transmitter is described in U.S. Pat. Nos. 5,457,394 and 5,517,198, incorporated herein by reference, and the receiver is described in U.S. Pat. Nos. 5,523,760 and 5,345,471, incorporated herein by reference.

Dipstick 70 passes through a hole 90 bored through piston 68 and a hole 92 bored through at least a portion of cylinder rod 44. Dipstick 70 and piston 68 make sliding mechanical contact and may be lubricated by hydraulic fluid or oil within the cylinder. The mechanical contact establishes an electrical path between dipstick 70 and piston 68. It may also be sufficient to establish a capacitative path without direct mechanical contact between dipstick 70 and piston 68. Piston 68 includes a rear surface 94 and a front surface 96. As pulses from pulse launcher 86 reach rear surface 94, the electrical impedance discontinuity between piston 68 and the adjacent hydraulic fluid cause reflections which travel back along dipstick 70 to unit 78. The time for a transmitted pulse to travel from the transmitter to piston 68 and for a reflected pulse to travel back to the receiver depends upon the position of piston 68.

Hole 92 within cylinder rod 44 accommodates the passage of dipstick 70 as piston 68 and rod 44 travel within the cylinder in the directions shown by arrow 98. Hole 92 may extend through the entire length of rod 44, or through only a portion of rod 44 when the length of rod 44 prevents free end 100 of rod 44 from reaching front end 82 of the cylinder. Free end 100 may be attached to a rod eye 102 for attachment to implement 12. However, rod eye 102 may be replaced with any suitable mechanical interface for transferring force to the implement, arm or boom being moved.

The equivalent-time T and R signals appearing at ports 3 and 4 of directional sampler 74 are applied via lines 104 and 106 to a directional set/reset circuit 108. Circuit 108 includes first and second threshold comparators 110 and 112, and a set/reset flip-flop 114. Threshold comparators 110 and 112 compare the equivalent-time replicas of the T and R signals with voltage references $-V_{REF}$ and $+V_{REF}$ that have voltage levels of about half of the peak amplitudes of the T and R signals, respectively. The outputs of comparators 110 and 112 set and reset flip-flop 114, respectively. Flip-flop 114 outputs a variable-width range pulse on line 116.

In operation, real-time T pulses from pulse generator 72 are applied to port 1 of directional sampler 74, coupled in real-time to port 2, and applied to transmitter/receiver unit 78. The T pulses are launched along dipstick 70 towards piston 68 and are reflected by the impedance discontinuity at piston 68. The reflected pulses are detected by the receiver as real-time R pulses. Equivalent-time replicas of the real-time T and R pulses appear at ports 3 and 4 of directional sampler 74. The replicas are applied to directional set/reset circuit 108 such that flip-flop 114 is set by the equivalent-time T signal and reset by the equivalent-time R signal. The pulse width of the output from flip-flop 114 represents the time for UWB pulses to travel from the transmitter to piston 68 and for the reflected pulses to travel from piston 68 back to the receiver.

Circuit 66 is accurate even when the T and R pulses are close or even overlap in time. The reflected R signal is isolated from port 3 and cannot set flip-flop 114, and the transmitted T signal is isolated from port 4 and cannot reset flip-flop 114. Thus, the position of piston 68 within the cylinder is measured accurately even when piston 68 is close to launcher 86.

The variable-width range pulse on line 116 is converted to a position signal 118 by a piston range conversion circuit 120. In one embodiment, conversion circuit 120 includes a range counter gated by the variable-width range pulse. If the equivalent-time range scale is 1 msec=1 inch and the clock speed of the counter is 1 MHz, the range counter will record 1000 counts/inch for a resolution of 0.001 inch/count. The counter value can be read by a microprocessor or microcontroller and converted into a scaled digital position signal for use by a control algorithm.

In another embodiment, conversion circuit 120 includes analog circuitry to convert the variable-width range pulse into an analog signal (e.g., a DC voltage or current, PWM signal or another type of electrical signal) which represents the position of piston 68. Interface circuits to convert a variable-width pulse into various types of electrical signals are known, and may provide a less expensive circuit than a microprocessor circuit.

Thus, circuit 66 operates in the time domain since the position of piston 68 is measured by the equivalent-time signal on line 116. This is true regardless of whether the EM bursts include UWB pulses or pulses having a frequency component. Operation in the time domain simplifies the circuitry compared with operation in the frequency domain (e.g., measuring piston position by determining the resonance frequency of a cavity formed by the piston and the cylinder).

In pneumatic cylinder applications, the electrical parameters of the air within the cylinder are relatively stable with respect to temperature. Thus, the piston position signal may not need to be compensated for variations in the air's characteristics. In hydraulic cylinder applications, however, electrical parameters of the oil surrounding the transmission guide (e.g. dipstick 70) within the cylinder affect the speed at which the transmitted and reflected pulses travel. In particular, the speed of the pulses depends upon the dielectric constant of the surrounding fluid, which in turn depends upon factors such as the temperature of the fluid, contamination of the fluid, and type of fluid. Thus, the piston position signal is compensated to account for variations in the dielectric constant of the fluid.

Referring still to FIG. 2, the dielectric constant of the hydraulic oil can be detected using a compensation circuit 122. In this embodiment, compensation circuit 122 receives the real-time T signal on line 124 from unit 78 and generates a compensation signal 126 applied to conversion circuit 120. The real-time T signal can be tapped, at pulse launcher 86, or at an internal node of unit 78. Compensation circuit 122 can include a pulse level analyzer (PLA) to measure the amplitude or level of the T signal. The PLA includes, for example, a peak-level detector which locks onto the peak voltage of the T signal. Since the energy per T pulse is constant, electrical characteristics (i.e., dielectric constant) of the fluid surrounding the launching plate affects the voltage caused by the launched constant-energy pulse. The output of the peak-level detector is used to generate compensation signal 126 representing the peak voltage. Compensation signal 126 may be, for example, a voltage or a current. Thus, compensation signal 126 is responsive to the dielectric constant of the hydraulic fluid.

Other implementations of compensation circuit 122 can be used to generate compensation signals representing the dielectric constant of the fluid. For example, compensation circuit 122 can generate excitation signals at varying frequencies, apply the excitation signals to a body having a cavity filled with the fluid, and determine the frequency at which the cylinder resonates. The resonance frequency depends on the dielectric constant. The body may have a cylindrical, rectangular or other shape having a generator conducive to producing and measuring electromagnetifield, placed within cylinder housing 42, or elsewhere within the hydraulic system where it will be filled with fluid-preferably with a dielectric constant equal or close to that of the fluid within the cylinder. Other circuits 122 are explained below in relation to FIGS. 3–5.

Other compensation circuits 122 can also generate compensation signals based upon other parameters of the fluid which affect the speed of the pulses along the transmission guide. For example, compensation signals can be determined directly from the fluid temperature using signals from a thermocouple, RTD, thermistor or other temperature sensor.

When conversion circuit 120 is microprocesor-based, compensation signal 126 can be converted into a digital signal using an appropriate interface (e.g., an A/D converter). The digital compensation signal is used to modify position signal 118. Depending upon the system and application, algorithms or tables for performing this conversion are determined by calibrating the system and, possibly, using appropriate curve fitting algorithms, fuzzy logic, or other well-known techniques.

When conversion circuit 120 does not include a microprocessor, compensation signal 126 is used to modify the signal generated from the variable-width pulse from flip-flop 114. For example, if the variable-width pulse and compensation signals have been converted into DC voltages, then conversion circuit 120 can adjust the DC voltage range signal using the DC voltage compensation signal to generate a compensated piston position signal.

Figure 3:
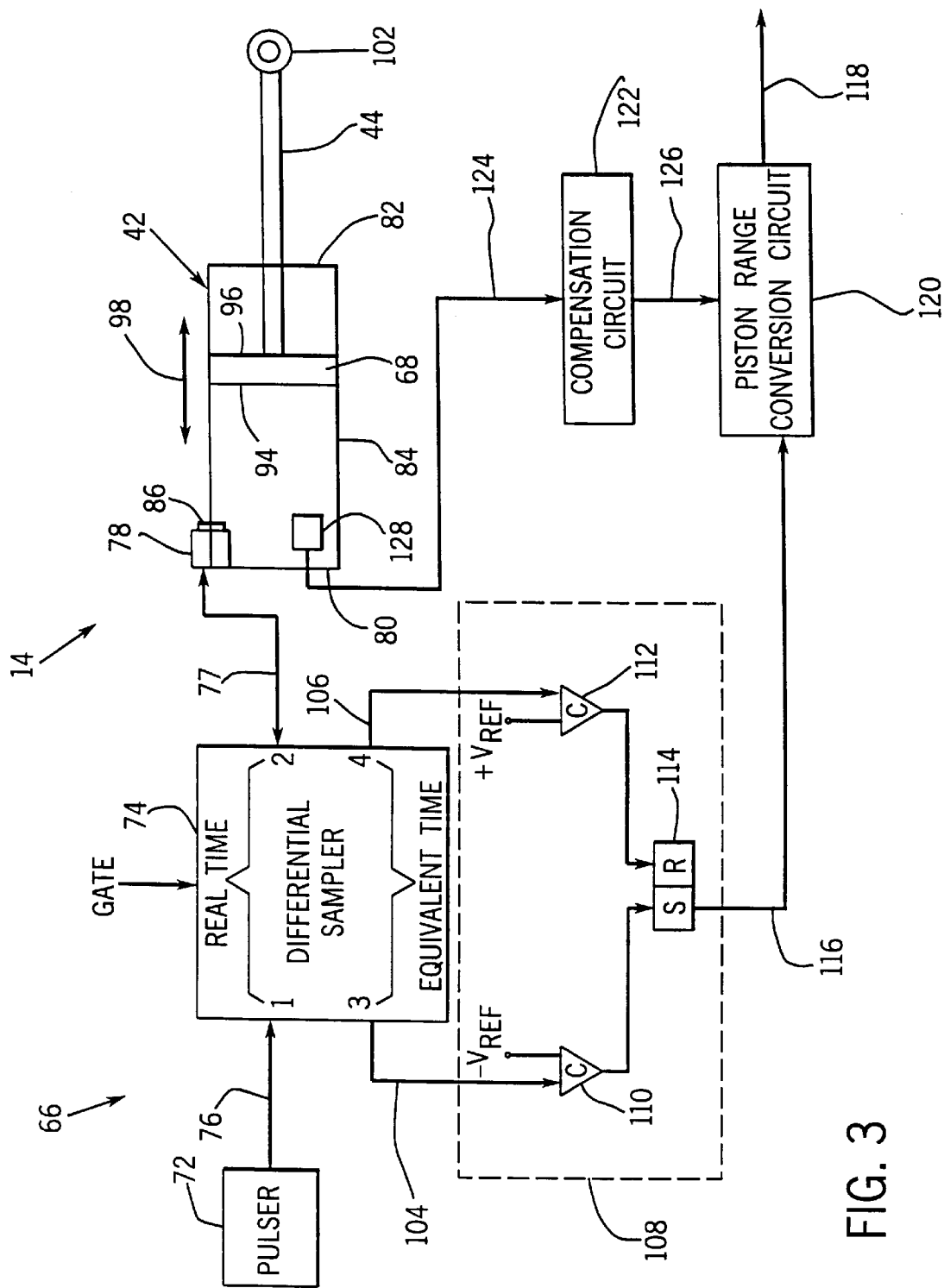
FIG. 3 is a block diagram showing a hydraulic cylinder and a circuit for sensing the position of a piston moveable within the cylinder by transmitting and receiving EM bursts along the housing of the cylinder.

FIG. 3 shows an alternative MIR system for sensing position of piston 68 within the cylinder by transmitting UWB pulses and receiving reflected pulses. There are two major differences between the systems shown in FIGS. 2 and 3. The first difference relates to using cylinder housing 42 to act as a transmission guide instead of dipstick 70. The second difference relates to using a capacitor circuit 128 to generate compensation signal 126 instead of using a PLA circuit which analyzes T pulses. However, these differences are independent of each other, and either the dipstick or cylinder-housing transmission guide can be used with any type of compensation circuit.

In FIG. 3, transmitter/receiver unit 78 is mounted at rear end 80 of the cylinder such that pulse launcher 86 launches the UWB pulses towards piston 68 along housing 42. Pulse launcher 86 can be integral with unit 78, or coupled to unit 78 with wires to allow greater flexibility in mounting unit 78. Pulse launcher 86 is coupled to side wall 84 of housing 42 at or close to rear end 80. Pulse launcher 86 can be mounted away from rear end 80 if it does not interfere with piston 68 in the maximum retracted position. Alternatively, unit 78 and pulse launcher 86 are mounted on front end 82 of cylinder housing 42 such that the UWB pulses are launched in the opposite direction towards piston 68. The resulting position signal is then a measure of distance between front wall 82 and the front surface 96 of piston 68.

In operation, UWB pulses are launched along side wall 84 of cylinder housing 42 and travel along side wall 84 to rear surface 94 of piston 68. The electrical impedance discontinuity between piston 68 and the adjacent hydraulic fluid causes reflections which travel along side wall 84 back to the receiver. The time for a transmitted pulse to travel from the transmitter to piston 68 and for the reflected pulse to travel to the receiver depends upon the position of piston 68 within the cylinder. Using side wall 84 as a transmission guide instead of dipstick 70 minimizes modifications to the cylinder to accommodate the MIR system.

Compensation circuit 122 is coupled to a capacitor circuit 128 mounted within the cylinder near or adjacent to pulse launcher 86. Capacitor circuit 128 includes a pair of metal plates separated by a thin layer (e.g., about 1 mm) of hydraulic fluid. Alternatively, capacitor circuit 128 includes two concentric cylinders separated by fluid. Circuit 122 is configured to measure the capacitance of capacitor circuit 128 which depends upon the dielectric constant of the hydraulic fluid between the capacitor plates. The capacitance signal is used by piston range conversion circuit 120 as a measure of the dielectric constant of the fluid.

Capacitor circuit 128 can also be mounted within a hose which supplies fluid to actuator 14, or within a shunt which receives only a portion of the fluid flowing through the hose. Measuring the dielectric constant of the fluid outside of the cylinder is advantageous because it minimizes modifications to the cylinder. However, temperature differences between fluid within and without the cylinder may adversely impact the accuracy of the compensation signal and, therefore, the accuracy of the piston position signal.

Figure 4:
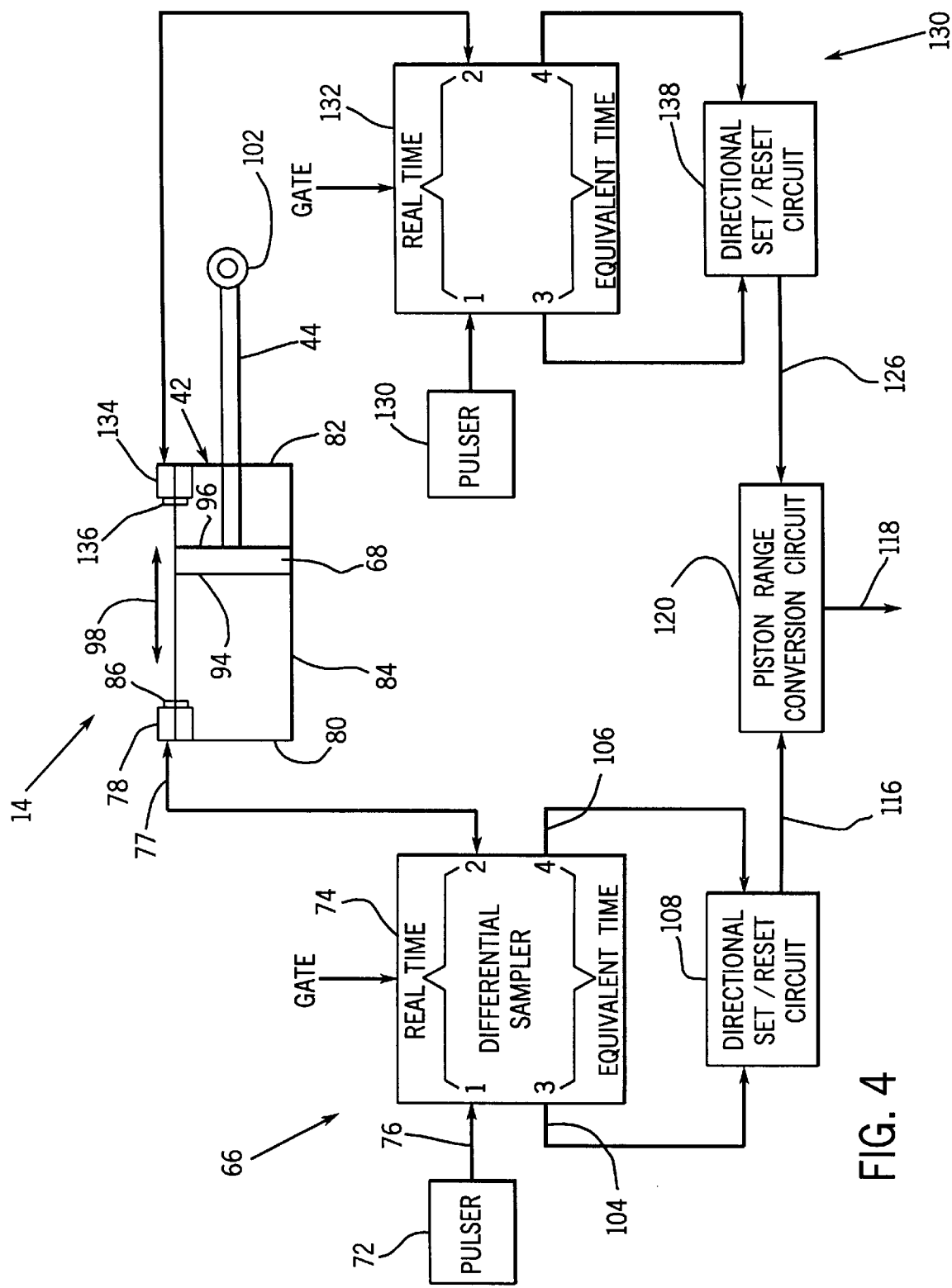
FIG. 4 is a block diagram showing a hydraulic cylinder and a circuit for sensing the position of a piston moveable within the cylinder similar to the circuit shown in FIG. 3 except for the configuration of the compensation circuit.

Referring to FIG. 4, another MIR system for sensing the position of piston 68 is shown. This embodiment is similar to the embodiment of FIG. 3 except the compensation circuit comprises a second piston position measuring circuit mounted at front end 82 of the cylinder. The components of each position measuring circuit is the same or similar (i.e., pulse generator 72, directional sampler 74, transmitter/receiver unit 78, pulse launcher 86 and directional set/reset circuit 108 are the same or similar to pulse generator 130, directional sampler 132, transmitter/receiver unit 134, pulse launcher 136, and directional set/reset circuit 138). Compensation signal 126 now represents the time required for UWB pulses to travel from the transmitter of unit 134 to front surface 96 of piston 68 and for reflected pulses to travel back to the receiver.

Piston range conversion circuit 120 determines the position of piston 68 within the cylinder using both time signals. The piston position equals the full range of travel within the cylinder multiplied by the ratio of the first time signal divided by the sum of the first and the second time signals. Assume, for example, that conversion circuit 120 includes two range counters having a clock speed of 1 MHz for measuring the variable-width pulses from lines 116 and 126, and that the equivalent-time range scale is 1 msec=1 inch. Also assume the internal distance in the cylinder between ends 80 and 82 is 36.5 inches and the width of piston 68 between surfaces 94 and 96 is 0.5 inches, for a range of travel within the cylinder of 36.0 inches. If the first time signal (i.e., pulse width) on line 116 gives a count of 23,760 and the second time signal (i.e., pulse width) on line 126 gives a count of 11,880, piston 68 is at a position given by:

Position=36 in*(23,760/(23,760+11,880))=24 in.

Thus, the distances between rear end 80 and piston 68 is 24 inches and between front end 82 and piston 68 is 12 inches. Effects of variations in pulse speed due to the dielectric constant of the fluid are cancelled.

The circuit of FIG. 4 may be modified to decrease the number of components and system cost. For example, a multiplexer circuit can be used to multiplex the pulse signals on line 77 between transmitter/receiver units 78 and 134 so conversion circuit 120 alternately receives variable-width pulses representing the distances between rear end 80 and piston 68 and between front end 82 and piston 68. Conversion circuit 120 processes the alternating signals as the first and second time signals, respectively. Such a circuit may increase the output accuracy since circuit errors may be cancelled.

Figure 5:
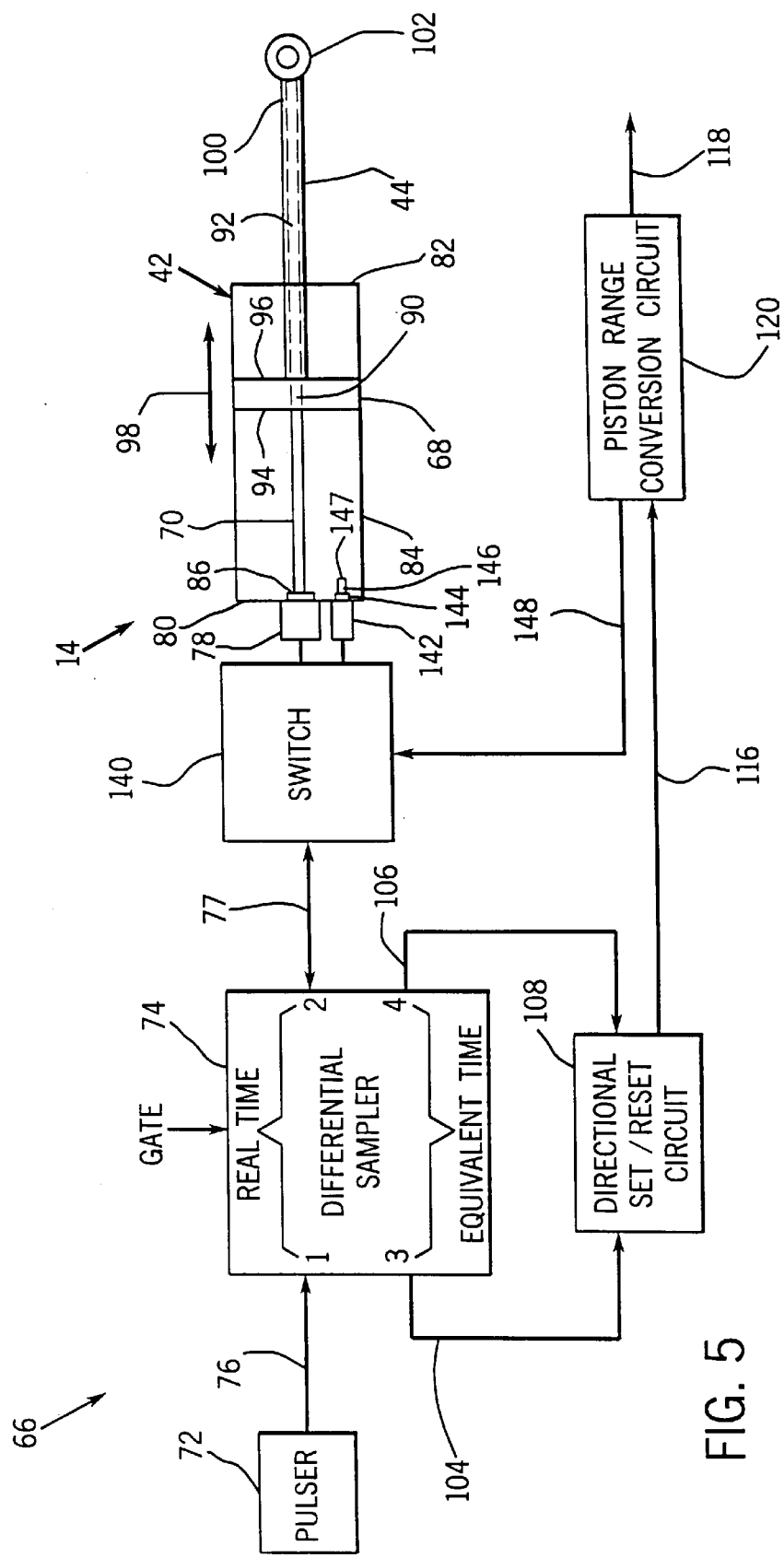
FIG. 5 is a block diagram showing a hydraulic cylinder and a circuit for sensing the position of a piston moveable within the cylinder similar to the circuit shown in FIG. 2 except for the configuration of the compensation circuit.

Referring to FIG. 5, yet another MIR system for sensing the position of piston 68 is shown. This embodiment is similar to the embodiment shown in FIG. 2 except the compensation circuit comprises a multiplexer or switch 140, a second transmitter/receiver unit 142, a second pulse launcher 144, and a compensation dipstick 146. Unit 142 and pulse launcher 144 are the same or similar to unit 78 and pulse launcher 86, respectively. Compensation dipstick 146 is a transmission guide of known length (e.g., 1 or 2 inches) which does not interfere with the movement of piston 68. Port 2 of directional sampler 74 is selectively connected to transmitter/receiver units 78 and 142 by switch 140 under the control of a select signal 148 from piston range conversion circuit 120.

When port 2 is connected to transmitter/receiver unit 78, the operation is as described above. However, when port 2 is connected to transmitter/receiver unit 142, the transmitted UWB pulses are launched via pulse launcher 144 along compensation dipstick 146. The UWB pulses are reflected by the electrical impedance discontinuity at the interface between the end 147 of compensation dipstick 146 and the fluid. The reflections detected by the receiver in unit 142 are processed by directional sampler 74 and directional set/reset circuit 108 in the manner described above. Since the length of compensation dipstick 146 is known, the pulse width on line 116 is a measure of the dielectric constant of the fluid. For example, the pulse width could be used as an input to an empirically-determined table or equation which correlates pulse width to dielectric constant.

Figure 6:
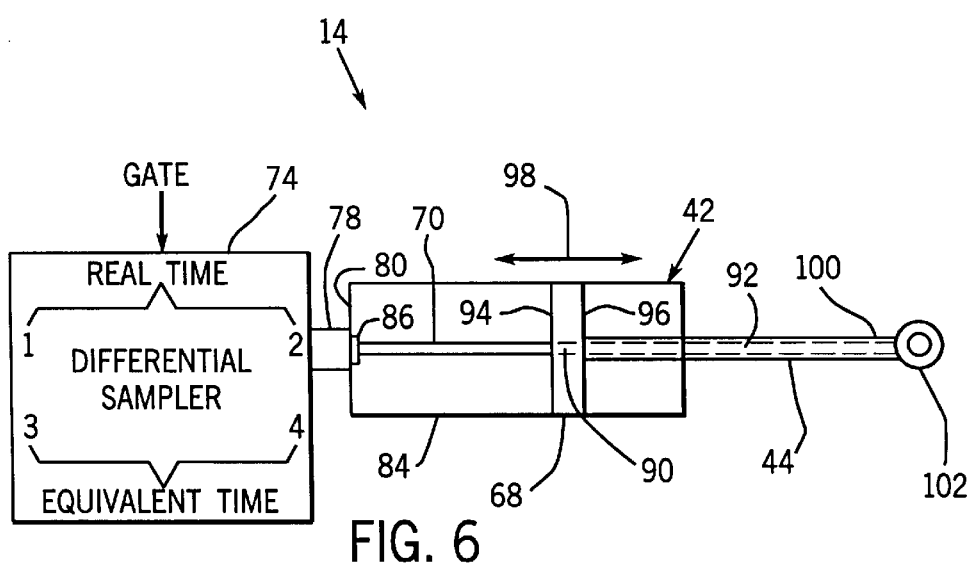
FIG. 6 is a block diagram showing a hydraulic cylinder and a portion of a circuit for sensing the position of a piston moveable within the cylinder similar to the circuit shown in FIG. 2 except the directional sampler and the transmitter/receiver are integral.

Referring to FIG. 6, another embodiment of part of an MIR system for sensing the position of piston 68 is shown.

This embodiment is similar to the embodiment of FIG. 2 except directional sampler 74 and transmitter/receiver unit 78 are integral (i.e., one-piece).

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of determining the positions of a piston moveable within a cylinder housing, the cylinder housing including a first end, a second end, and a side wall between the first and the second ends, the cylinder housing containing a fluid therein, comprising the steps of:

generating electromagnetic (EM) bursts;

launching the EM bursts from a launcher coupled to the side wall at the first end of the cylinder housing, the EM bursts being launched along the side wall towards the piston, whereby the cylinder housing acts as a transmission guide for the EM bursts;

detecting reflections of the EM bursts traveling back along the side wall of the cylinder housing from the piston, the reflections due to an impedance discontinuity between the piston and the fluid;

generating a timing signal representative of the time between launching the EM bursts and detecting the reflections; and converting at least the timing signal into a position signal representative of the position of the piston within the cylinder housing.

2. The method of claim 1, wherein the EM bursts include ultra-wideband pulses.

3. The method of claim 1, wherein the EM bursts include pulses having a carrier frequency component.

4. The method of claim 1, wherein the steps of launching the EM bursts and detecting the reflections are performed by a transmitter and a receiver coupled to the side wall of the cylinder housing.

5. The method of claim 4, wherein the transmitter includes the launcher coupled to the side wall of the cylinder housing and configured to launch the EM bursts along the side wall.

6. The method of claim 1, further comprising the steps of integrating and filtering the reflections of the EM bursts.

7. The method of claim 1, wherein the EM bursts and the reflections are real-time signals and the timing signal is an equivalent-time signal.

8. The method of claim 1, further comprising the step of generating a compensation signal responsive to a parameter of a fluid within the cylinder housing, and the converting step includes converting at least the timing and compensation signals into the position signal.

9. The method of claim 8, wherein the compensation signal is responsive to the dielectric constant of the fluid.

10. The method of claim 9, wherein the step of generating a compensation signal includes applying an excitation signal at varying frequencies to a body having a cavity filled with the fluid and determining the resonance frequency.

11. The method of claim 9, wherein the step of generating a compensation signal includes measuring the capacitance of a pair of conductors having a layer of the fluid therebetween.

12. The method of claim 9, wherein the step of generating a compensation signal includes the steps of:

generating second EM bursts;

launching the second EM bursts along the cylinder housing towards the piston from a direction opposite that of the first EM bursts;

detecting reflections of the second EM bursts along the cylinder housing from the piston; and generating a second timing signal representative of the time between launching the second EM bursts and detecting the reflections of the second EM bursts.

13. The method of claim 9, wherein the step of generating a compensation signal includes the steps of:

generating second EM bursts;

launching the second EM bursts along a compensation dipstick having a known length and surrounded by the fluid;

detecting reflections of the second EM bursts along the compensation dipstick; and generating a second timing signal representative of the time between launching the second EM bursts and detecting the reflections of the second EM bursts.

14. An apparatus for determining the positions of a piston moveable within a cylinder housing, the cylinder housing including a first end, a second end, and a side wall between the first and the second ends, the cylinder housing containing a fluid therein, comprising:

a generator for generating EM bursts;

a transmitter coupled to the generator and to the side wall at the first end of the cylinder housing, the transmitter configured to launch the EM bursts towards the piston along the side wall, whereby the cylinder housing acts as a transmission guide for the EM bursts;

a receiver coupled to the side wall at the first end of the cylinder housing and configured to detect reflections after the EM bursts are reflected by the piston to travel back towards the receiver along the side wall of the cylinder housing, the reflections due to an impedance discontinuity between the piston and the fluid;

a timing circuit configured to generate a timing signal representative of the time for the EM bursts to travel from the transmitter to the piston and for the reflections to travel from the piston to the receiver; and a conversion circuit configured to convert at least the timing signal into a position signal representative of the position of the piston within the cylinder housing.

15. The apparatus of claim 14, wherein the EM bursts include ultra-wideband pulses.

16. The apparatus of claim 14, wherein the EM bursts include pulses having a carrier frequency component.

17. The apparatus of claim 14, wherein the transmitter includes a pulse launcher coupled to the side wall of the cylinder housing and configured to launch the EM bursts along the side wall.

18. The apparatus of claim 14, further comprising:

a directional sampler circuit having a first real-time port for receiving the EM bursts from the generator, a second real-time port coupled to the first port for sending the EM bursts to the transmitter and for receiving the reflections, a third port coupled to the first port and isolated from the second port for providing an equivalent-time representation of the EM bursts, and a fourth port coupled to the second port and isolated from the first port for providing an equivalent-time representation of the reflections, wherein the equivalent-time representations of the EM bursts from the third port and the reflections from the fourth port are applied to the timing circuit.

19. The apparatus of claim 19, wherein the timing circuit includes a first comparator circuit coupled to the third port, a second comparator circuit coupled to the fourth port, and a set-reset flip-flop circuit set by the equivalent-time representation of the EM bursts and reset by the equivalent-time representation of the reflections.

20. The apparatus of claim 14, further comprising a compensation circuit configured to generate a compensation signal responsive to a parameter of a fluid within the cylinder housing, wherein the conversion circuit is configured to convert at least the timing and compensation signals into the position signal.

21. The apparatus of claim 20, wherein the compensation signal is responsive to the dielectric constant of the fluid.

22. The apparatus of claim 21, wherein the compensation circuit is configured to apply an excitation signal at varying frequencies to a body having a cavity filled with th e fluid and to determine th e resonance frequency.

23. The apparatus of claim 21, wherein the compensation circuit includes a Pair of conductors having a layer of the fluid therebetween.

24. The apparatus of claim 21, wherein the compensation circuit includes:

a second generator for generating second EM bursts;

a second transmitter coupled to the second generator and to the cylinder housing, the second transmitter configured to launch the second EM bursts towards the piston along the cylinder housing from a direction opposite that of the first EM bursts;

a second receiver coupled to the cylinder housing and configured to detect second reflections after the second EM bursts are reflected by the piston towards the second receiver along the cylinder housing; and a second timing circuit configured to generate a second timing signal representative of the time for the second EM bursts to travel from the second transmitter to the piston and for the second reflections to travel from the piston to the second receiver.

25. The apparatus of claim 21, wherein the compensation circuit includes:

a second generator for generating second EM bursts;

a compensation dipstick having a known length and surrounded by the fluid;

a second transmitter coupled to the second generator and to the compensation dipstick, the second transmitter configured to launch the second EM bursts along the compensation dipstick;

a second receiver coupled to the compensation dipstick and configured to detect second reflections after the second EM bursts are reflected by an interface between the compensation dipstick and the fluid towards the second receiver along the compensation dipstick; and a second timing circuit configured to generate a second timing signal representative of the time for the second EM bursts to travel from the second transmitter to the interface and for the second reflections to travel from the interface to the second receiver.

* * * * *

UNITED STATES PATENT AND TRADEMARK OFFICE
CERTIFICATE OF CORRECTION

PATENT NO. : 5,977,778
DATED : November 2, 1999
INVENTOR(S) : Danley C. Chan; Alan D. Berger It is certified that error appears in the above-identified patent and that said Letters Patent is hereby corrected as shown below:

In claim 19, line 65, replace "19" with --18--.

In claim 22, line 14, replace "th e" with --the--.

In claim 22, line 15, replace "th e" with --the--.

In claim 23, line 17, replace "Pair" with --pair--.

Signed and Sealed this

Thirtieth Day of May, 2000

Attest:

Q. TODD DICKINSON

Attesting Officer

Director of Patents and Trademarks